(12) United States Patent
Vertegaal

(10) Patent No.: US 8,220,871 B2
(45) Date of Patent: Jul. 17, 2012

(54) RECLINING GROUP

(75) Inventor: Henk Vertegaal, Hengelo (NL)

(73) Assignee: HTS Hans Torgersen & Sonn AS, Kroederen (NO)

( * ) Notice: Subject to any disclaimer, the term of this patent is extended or adjusted under 35 U.S.C. 154(b) by 0 days.

(21) Appl. No.: 11/688,888

(22) Filed: Mar. 21, 2007

(65) Prior Publication Data
US 2008/0067844 A1    Mar. 20, 2008

(30) Foreign Application Priority Data

Mar. 28, 2006 (GB) .................................. 0606193.1

(51) Int. Cl.
*A47C 1/08* (2006.01)
(52) U.S. Cl. ......... 297/256.13; 297/256.16; 297/344.22; 297/250.1
(58) Field of Classification Search ............... 297/250.1, 297/256.1, 256.13, 256.16, 183.4, 183.1, 297/344.21, 344.22
See application file for complete search history.

(56) References Cited

U.S. PATENT DOCUMENTS

| | | | | |
|---|---|---|---|---|
| 2,679,285 A | * | 5/1954 | Luckhardt | 297/321 |
| 4,205,877 A | | 6/1980 | Ettridge | |
| 4,545,617 A | * | 10/1985 | Drexler et al. | 297/340 |
| 5,265,934 A | * | 11/1993 | Forget | 297/237 |
| 5,718,477 A | * | 2/1998 | Schuler | 297/341 |
| 5,746,478 A | | 5/1998 | Lumley | |
| 5,788,326 A | * | 8/1998 | Kawade et al. | 297/236 |
| 6,129,420 A | * | 10/2000 | Judic | 297/330 |
| 6,196,629 B1 | * | 3/2001 | Onishi et al. | 297/256.12 |
| 6,227,616 B1 | | 5/2001 | Blanke | |
| 6,347,832 B2 | * | 2/2002 | Mori | 297/256.13 |
| 7,108,326 B2 | * | 9/2006 | Schurg | 297/354.12 |
| 7,246,855 B2 | * | 7/2007 | Langmaid et al. | 297/256.13 |
| 7,364,232 B2 | * | 4/2008 | Mees van der Bijl et al. | 297/256.1 |
| 2001/0004163 A1 | * | 6/2001 | Yamazaki | 297/256.16 |
| 2003/0164632 A1 | | 9/2003 | Sedlack | |

FOREIGN PATENT DOCUMENTS

| | | |
|---|---|---|
| DE | 2128927 | 12/1972 |
| GB | 1581408 | 12/1980 |
| GB | 2278775 | 12/1994 |
| JP | 2005169004 | 12/2003 |
| WO | 99/07573 | 2/1999 |

\* cited by examiner

*Primary Examiner* — David Dunn
*Assistant Examiner* — Erika Garrett
(74) *Attorney, Agent, or Firm* — Christian D. Abel

(57) ABSTRACT

Child safety seat to be placed in a vehicle, comprising at least one movable section. The movable section is provided for displacement in the first direction and prevented from displacement in the second direction, when a predetermined weight is exerted on the child safety seat, preferably on the movable section.

8 Claims, 1 Drawing Sheet

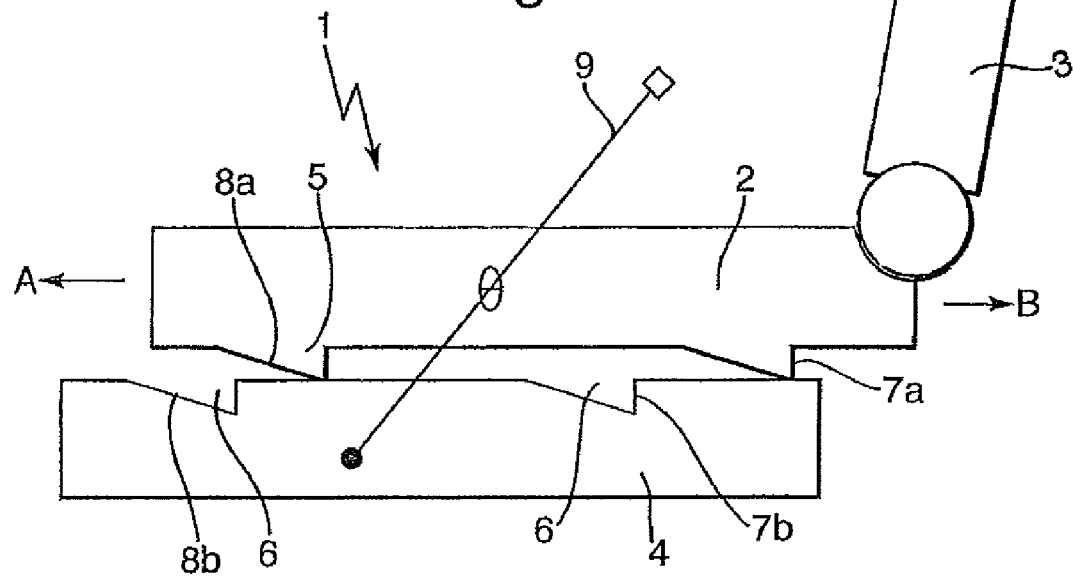
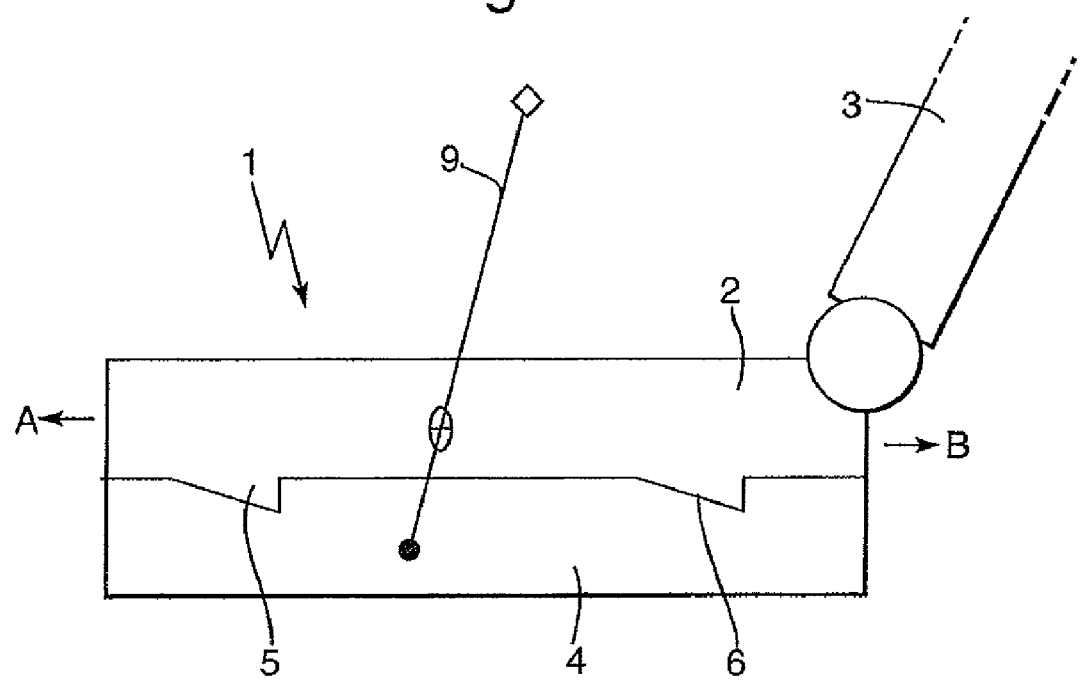

RECLINING GROUP

FIELD OF THE INVENTION

The invention concerns a child safety seat to be placed in a vehicle.

BACKGROUND OF THE INVENTION

Most child safety seats are arranged with a reclining mechanism to alter the inclination of the back section of the child safety seat, and thus being able to bring the child safety seat between at least a first upright position and a second reclined position. The upright position is usually used as a sitting position and the reclined position as a sleeping position for the child to be seated in the child safety seat. When designing the child safety seat with respect to the reclining mechanism of the child safety seat, it is desirable that the adjustment between the various positions is to be carried out without conflicting with the original seat of the vehicle.

The adjustment of the child safety seat might be carried out using various arrangements. One solution is to arrange one section, preferably the sitting section of the child safety seat, movable. By moving this movable section in a first direction, such as a forward direction corresponding to the driving direction of the vehicle, the child safety seat may be brought into a reclined position, and by moving the movable section in a second direction, such as a backward direction opposite to the driving direction of the vehicle, the child safety seat may be brought into an upright position. The child safety seat may of course assume other positions in between the reclined position and the upright position. Other sections of the child safety seat are arranged so that these sections follow the movable section. Preferably, the displacements of the movable section determine the reclining of the back section. The back section may be connected to the movable section by means which allow for adjustment of the angle between the movable section and the back section. The connection may be provided for instance by some sort of pivot connection.

Usually, bringing the child safety seat from a reclined position to an upright position is not to be carried out on a child safety seat using a three point safety belt. The will be discussed in the following:

When bringing the child safety seat between the various positions, a problem arises when the movable section is to be displaced from its front position, corresponding to a reclined position of the child safety seat, to a rear position, corresponding to an upright position of the child safety seat. When the seat belt is secured around the child as the child safety seat is placed in a reclined position, a greater length of seat belt of the vehicle has to be used than if the child safety seat is placed in an upright position. The retractor arrangement of the seat belt is not capable of reducing the belt length when moving the child safety seat from the reclined position to an upright position. This shifting of positions thereby results in a loose fastening of the seat belt around the child. This loose arrangement of the seat belt is not satisfactory when regarding the safety requirements of a child safety seat. If the adult does not re-buckle the child, the child may endure severe damages in the case of a sudden retardation of the vehicle.

SUMMARY OF THE INVENTION

The object of the invention is to eliminate the risk of exposing the child to a possible dangerous situation when altering the child safety seat between the various positions. A further object of the invention is to provide a solution wherein the child safety seat using a three point safety belt, may be adjusted from a reclined position to an upright position without inducing a risky situation on the child. The object of the invention is obtained by the solution as defined in the independent claim, wherein further embodiments of the invention are presented in the following dependent claims.

In accordance with the invention the child safety seat comprises at least one movable section. The movable section may be arranged to be displaceable in a first and a second direction. The movable section may preferably be constituted by the sitting section and an adjustable back section may be connected to the sitting section. The displacement of the movable section may bring the child safety seat between a first position for instance an upright position and a second position for instance at least a reclined position. The child safety seat may be brought into the upright position by displacement of the movable section in the second direction from the reclined position. Further, the child safety seat may be brought into the reclined position by displacement of the movable section in the first direction from the upright position. A control mechanism such as a handle may be provided to conduct displacement of the movable section.

In accordance with the invention the child safety seat is prepared so that displacements in the first and second direction only are possible under given circumstances. The child safety seat is provided so that when a predetermined weight is exerted on the child safety seat, preferably on the movable section, the displacement of the movable section is to occur in the first direction and prevented from occurring in the second direction. When the child safety seat is a forward facing one, the first direction preferably coincide with the forward driving direction of the vehicle, and the second direction preferably coincide with the opposite direction, namely the backward direction. Preferably the predetermined weight necessary to prevent displacement in the second direction is to be provided by the weight of the child to use the child safety seat. Alternatively the weight might be provided by other objects or arrangements of the child safety seat.

By this arrangement of movable seat, the user is simply not able to adjust the child safety seat from the reclined position to the upright position when the child is seated in the child safety seat. The risk of a seat belt which is not tightened as required in such a situation, is thereby eliminated.

When the weight exerted on the child safety seat, such as on the movable section, is less than the predetermined weight, preferably when no weight is exerted on the child safety seat, the movable section is provided for displacement both in the first and the second direction. The child safety seat may then be adjusted freely between an upright position and a reclined position.

To provide for the displacement of the movable section to occur, in one embodiment the child safety seat also comprises a base. The movable section is arranged displaceable relative to the base to be moved in the first and second direction to obtain a reclined or an upright position, wherein the displacement to occur of course depends on the weight exerted on the child safety seat.

In accordance with a preferred embodiment the child safety seat is arranged with engagement means, which engagement means prevent displacement in the second direction, but allows displacement in the first direction, when a predetermined weight is exerted on the child safety seat, preferably the movable section. These engagement means may further be provided so that when the weight is less than the predetermined weight, preferably when no weight is exerted on the child safety seat, preferably the movable section, the movable section is free to be displaced in the first and second direction.

The engagement means may comprise first engagement means provided on the movable section and second engagement means provided on the base. The first and second engagement means may be arranged to provide for the child safety seat to be displaceable and non-displaceable in the respective directions, in accordance with a predetermined weight or weight less than the predetermined weight, preferably no weight being exerted on the child safety seat.

In one embodiment the first engagement means is constituted by at least one projection and the second engagement means is constituted by at least one recess. The projection(s) are provided to be received in the recess or in each of the recesses.

Alternatively the engagement means may be provided by a snap connection, a hook or any other structure capable of providing an arrangement wherein the movable section is prevented from moving in the second direction, when a child is seated in the child safety seat, and which provides for movement in first and second direction when weight less than the predetermined weight, preferably no weight is exerted on the child safety seat.

The movable section may be provided displaceable relative to the base in a direction corresponding to the height direction of the child safety seat. This arrangement might be necessary to make sure that the movable section is positioned to move unobstructed in the first and second direction, for instance when no child is placed in the child safety seat. The arrangement of height displacement is of particular use, when employing projections and recesses, as the child safety seat needs to be provided to be able to insert and extract the projections to and from the respective recesses.

To arrange the movable section displaceable in the height direction, the movable section may be provided with a least a resilient element such as a spring, a fluid cylinder, magnetic devices etc.

The resilient element may determine the size of the weight to be exerted on the movable section to press the projections into the recess to obtain locking in the second direction. The child safety seat may be arranged to cause displacement of the movable section thereby bringing the child safety set into the upright position, when the predetermined weight is removed or reduced from the movable section. This arrangement may be provided by the use of at least one resilient element such as a spring, a fluid cylinder, magnetic devices etc.

BRIEF DESCRIPTION OF THE DRAWINGS

In the following one embodiment of the invention will be described, by way of example, with reference to the accompanying figures, wherein FIG. 1 shows a side view of the child safety seat in a first position, FIG. 2 shows a side view of the child safety seat in a second position.

DETAILED DESCRIPTION OF THE INVENTION

The child safety seat 1 comprises a movable section 2, herein illustrated as the sitting section of the child safety seat 1. A back section 3 is connected to the movable section 2, preferably by means allowing for adjustment of the angle between the movable section 2 and the back section 3 to take place when the movable section 2 is displaced in first direction A or second direction B. The first direction A corresponds to the driving direction of the vehicle, when the child safety seat 1 is forward facing, and this direction is in the following denoted the forward direction. The second direction B corresponds to the opposite direction of the driving direction of the vehicle, when the child safety seat 1 is forward facing, and this direction is in the following denoted the backward direction.

The child safety seat 1 is further provided with a base 4, and the movable section 2 is displaceable relative to the base in a first direction and in certain circumstances also in the second direction. The movable section 2 is arranged with first engagement means. The first engagement means are shown as projections 5 having a stepped configuration. Each projection 5 has an outside surface constituted by an inclined surface 8a and a right angled orientated surface 7a. The base 4 is arranged with second engagement means shown as recesses 6, each with a configuration complementary to the configuration of each of the projections 5. Thus each recess 6 has an inclined surface 8b and a right angled orientated surface 7b. A handle 9 is provided for conducting the displacement of the movable section 2.

In FIG. 1 the movable section 2 has been displaced in the backward direction B and the child safety seat 1 is shown in an upright position. The projections 5 are shown in contact with the top surface of the base 4. The movable section 2 may be displaced in the forward direction from this position until reaching a position wherein the projections 5 are positioned just above the recesses 6. The child safety seat 1 may be provided by suitable means to keep the child safety seat 1 in this position when the weight exerted on the child safety seat is less than the predetermined weight, such as when no weight is placed on the movable section 2. If a predetermined weight such as provided by the weight of the child, is placed on the movable section 2, when the child safety seat 1 is placed with the projections 5 positioned just above the recesses 6 or when the child safety seat 1 is positioned as shown in FIG. 1 to be pushed from this position until the projections 5 are positioned just above the recesses 6, the projections 5 are pushed down into the recesses 6 due to the weight exerted on the movable section 2. The child safety seat is then placed into the second position, as shown in FIG. 2.

As long as the child remains on the movable section 2, the interaction between the configuration of the projections 5 and the complementary configuration of the recesses 6, makes sure that it is not possible to displace the child safety seat in the backward direction B from the position as shown in FIG. 2. This locked position of the child safety seat 1, provides a protection against misuse of the child safety seat. If the movable section 2 were to be displaced in the second direction B, the provisions of the seat belt retractor are not capable of tightening the seat belt sufficient to compensate for the displacement of the movable section 2. The displacement of the movable section 2 in the backward direction B, then leaves the seat belt loose around the child, and to obtain a sufficient securing the seat belt must be buckled up once more. However, there is a risk that the adult operating the child safety seat 1 does not detect the loose seat belt and this may create a possible dangerous situation. By arranging the child safety seat 1 so that the movable seat section 2 is prevented from being moved backward from the mentioned position, when a child is seated in the child safety seat, the possible dangerous situation is avoided.

When the weight exerted on the child safety seat is less than the predetermined weight, for instance when no weight is exerted on the movable section 2, or the weight is reduced or removed from the movable section 2, the projections 5 are positioned just above the recesses, preferably by the provisions of resilient elements (not shown) and the child safety seat 1 may be displaced in the backward direction B into the position shown in FIG. 1. Alternatively, the resilient elements may be provided so that the child safety seat 1 is returned to the position in FIG. 1 from the position in FIG. 2, when the weight is reduced or removed from the movable section 2, when the child safety seat is in the second position as shown in FIG. 2. The child safety seat 1 may be provided by adjusting devices to fit the child safety seat 1 to the specific weight or weight class of the child.

The engagements means 5, 6 may of course assume other configurations as long as the locking of the movable section 2 is obtained, when weight is exerted on the movable section 2 in the most forward position as described earlier. Further, the engagements means 5, 6 might be provided by other arrangements and devices such as hooks, snap connections etc.

The invention claimed is:

1. Child safety seat to be placed in a vehicle, comprising at least one movable section provided with first engagement means and a base provided with second engagement means, which first and second engagement means, when in contact, in cooperation allow displacement of the movable section in a first direction, but at the same time prevent displacement of the movable section in a second direction when a predetermined weight is exerted on the movable section, wherein the first engagement means comprises at least one projection having a stepped configuration and the second engagement means comprises at least one recess having a configuration complementary to the configuration of the projection of the first engagement means, the movable section being displaceable both in the first and the second direction when the weight exerted on the movable section is less than the predetermined weight, the movable section being a seating portion of the child safety seat, a back section further being connected to the seating portion, wherein displacement of the movable section relative to the base in the first direction arranges the child safety seat in a reclined position wherein the back section is reclined, and displacement of the movable section relative to the base in the second direction arranges the safety seat in a upright position wherein the back section is substantially upright.

2. Child safety seat in accordance with claim 1, wherein the predetermined weight is the weight of the child intended to utilize the child safety seat.

3. Child safety seat in accordance with claim 1, wherein the child safety seat is prevented from displacement in the second direction by an engagement arrangement that is activated by the weight of the child, said engagement arrangement being deactivated when the child is no longer seated.

4. Child safety seat in accordance with claim 1, wherein the movable section is displaceable relative to the base in a direction corresponding to the height direction of the child safety seat.

5. Child safety seat in accordance with claim 1, wherein the first direction corresponds to the driving direction of the vehicle and the second direction corresponds to the direction opposite to the driving direction.

6. Child safety seat in accordance with claim 1, further comprising a control mechanism including a handle to conduct displacement of the movable section.

7. Child safety seat for placement in a vehicle, said child safety seat having a reclined position, the back section being reclined in this position, and an upright position, the back section being substantially upright in this position, wherein the child safety seat is brought into the reclined position from the substantially upright position by displacement of a movable section, the back section being connected to the movable section, relative to a base in a first direction and brought into the upright position from the reclined position by displacement of the movable section relative to the base in a second direction, said child safety seat comprising a locking means activated by the weight of the child, said locking means being arranged to allow displacement of the movable section to the reclined position, but at the same time to prevent displacement of the moveable section to the substantially upright position when activated, wherein the locking means comprises at least one projection having a stepped configuration and at least one recess having a configuration complementary to the configuration of the projection.

8. Child safety seat in accordance with claim 7, wherein the moveable section is a sitting portion and wherein the locking means is disengaged when the weight of the child is removed from the sitting portion.

* * * * *